United States Patent [19]

Wright

[11] Patent Number: 5,196,038

[45] Date of Patent: Mar. 23, 1993

[54] FLUE GAS CONDITIONING SYSTEM

[76] Inventor: Robert A. Wright, 6250 Behner Crossing, Indianapolis, Ind. 46250

[21] Appl. No.: 919,525

[22] Filed: Jul. 24, 1992

Related U.S. Application Data

[63] Continuation-in-part of Ser. No. 494,234, Mar. 15, 1990, Pat. No. 5,032,154.

[51] Int. Cl.⁵ .............................................. B03C 3/66
[52] U.S. Cl. .......................................... 55/5; 55/106
[58] Field of Search ................................ 55/5, 106

[56] References Cited

U.S. PATENT DOCUMENTS

| | | | |
|---|---|---|---|
| 1,441,713 | 1/1923 | Prosser . | |
| 1,909,825 | 5/1933 | Hahn et al. . | |
| 2,602,734 | 7/1952 | Hedberg et al. | 75/1 |
| 2,864,456 | 12/1958 | Hall et al. | 183/7 |
| 3,284,990 | 11/1966 | Orne | 55/5 |
| 3,363,398 | 1/1968 | Wheatcroft et al. | 55/5 |
| 3,424,560 | 1/1969 | Carmassi et al. | 23/278 |
| 3,523,407 | 8/1970 | Humbert | 55/106 |
| 3,568,403 | 3/1971 | Richardson | 55/5 |
| 3,581,463 | 6/1971 | Roberts | 55/5 |
| 3,607,034 | 9/1971 | Henry et al. | 23/168 |
| 3,665,676 | 5/1972 | McKewen | 55/4 |
| 3,686,825 | 8/1972 | Busby | 55/5 |
| 3,689,213 | 9/1972 | Guerrieri | 55/5 |
| 3,704,566 | 12/1972 | Hardison et al. | 55/4 |
| 3,719,471 | 3/1973 | Jones | 75/65 |
| 3,722,178 | 3/1973 | Aaland et al. | 55/4 |
| 3,818,682 | 6/1974 | Farrow et al. | 55/106 |
| 3,893,828 | 7/1975 | Archer | 55/104 |
| 3,966,436 | 6/1976 | Archer | 55/147 |
| 3,993,429 | 11/1976 | Archer | 431/5 |
| 4,035,165 | 7/1977 | Archer | 55/13 |
| 4,042,348 | 8/1977 | Bennett et al. | 55/5 |
| 4,058,372 | 11/1977 | DeLaMater | 55/5 |
| 4,205,630 | 6/1980 | Regan | 122/1 R |
| 4,208,192 | 6/1980 | Quigley et al. | 55/5 |
| 4,223,640 | 9/1980 | Rochford et al. | 122/1 R |
| 4,284,417 | 8/1981 | Reese et al. | 55/2 |
| 4,305,909 | 12/1981 | Willett et al. | 422/169 |
| 4,333,746 | 6/1982 | Southam | 55/106 |
| 4,390,831 | 6/1983 | Byrd et al. | 323/240 |
| 4,466,815 | 8/1984 | Southam | 55/122 |
| 4,533,364 | 8/1985 | Altman et al. | 55/5 |
| 4,548,789 | 10/1985 | Ballestra | 422/160 |
| 4,624,685 | 11/1986 | Lueckenotte et al. | 55/13 |
| 4,770,674 | 9/1988 | Tellini et al. | 55/5 |
| 4,779,207 | 10/1988 | Woracek et al. | 364/500 |
| 4,844,723 | 7/1989 | Tellini et al. | 55/106 |
| 4,931,265 | 6/1990 | Leussler | 423/244 |
| 4,966,610 | 10/1990 | Krigmont et al. | 55/5 |
| 4,987,839 | 1/1991 | Krigmont et al. | 110/216 |
| 5,008,628 | 4/1991 | Krigmont et al. | 324/693 |
| 5,011,516 | 4/1991 | Altman et al. | 55/5 |
| 5,024,171 | 6/1991 | Krigmont et al. | 110/345 |
| 5,029,535 | 7/1991 | Krigmont et al. | 110/345 |
| 5,032,154 | 7/1991 | Wright | 55/106 |

FOREIGN PATENT DOCUMENTS

| | | |
|---|---|---|
| 639992 | 5/1964 | Belgium . |
| 888086 | 12/1971 | Canada . |
| 1178025 | 11/1984 | Canada . |
| 2809199 | 9/1979 | Fed. Rep. of Germany . |
| 3108709 | 9/1982 | Fed. Rep. of Germany . |
| 3109847 | 9/1982 | Fed. Rep. of Germany . |
| 45-13927 | 5/1970 | Japan . |

OTHER PUBLICATIONS

Sulfur Trioxide Conditioning, Journal of Air Pollution Control Association vol. 25, No. 2, Feb. 1975, pp. 156-158.

Primary Examiner—Charles Hart
Attorney, Agent, or Firm—Willian Brinks Olds Hofer Gilson & Lione

[57] ABSTRACT

Improved apparatus and methods for the treatment of boiler flue gas with sulfur trioxide conditioning agent include the beneficial use of catalytic converters that can be located immediately adjacent the injection site for their sulfur trioxide output, that can be individually sized and manufactured for variable required conditioning agent outputs, that can be individually controlled and can provide substantially improved conversion efficiency and that can provide an efficient, flexible, effective and relatively inexpensive multi-boiler flue conditioning system.

20 Claims, 5 Drawing Sheets

FLUE GAS CONDITIONING SYSTEM

RELATED APPLICATIONS

This application is a continuation-in-part of International Patent application Ser. No. PCT/US91/01706, filed Mar. 14, 1991, which is a continuation-in-part of U.S. patent application Ser. No. 07/494,234, filed Mar. 15, 1990, now U.S. Pat. No. 5,032,154, issued Jul. 16, 1991.

TECHNICAL FIELD

This invention relates to a flue gas conditioning system for treating particulate-ladened boiler flue gas with a conditioning agent to improve the removal of particulate matter by electrostatic means and, more particularly, relates to flue gas conditioning system including one or more catalytic converters or converter assemblies separated from the gas source and located adjacent the site of injection of the conditioning agent into the flue gas, for the conversion of a gas to a conditioning agent, and, still more particularly, where plural remote catalytic converters are provided to convert gas from a single source for conditioning a plurality of flue gas streams, for example, from more than one boiler.

BACKGROUND ART

Electrical utilities must burn increasing quantities of fossil fuels to satisfy the ever-increasing demand for electric power. At the same time, electric utilities face increasing clean-air standards that are imposed upon their operation. In trying to satisfy the divergent demands of increasing power and decreased air pollution, electrical utilities have turned to using low-sulfur coals to fire their boilers and generate the steam needed for electrical power generation.

Electrical utilities have long relied upon electrostatic means such as electrostatic precipitators to remove particulate matter from boiler flue gas. The efficiency of operation of the electrostatic precipitators in the removal of particulate matter from boiler flue gas is dependent, in part, upon the electrical resistivity of the entrained particulate matter in boiler flue gas. It has been found that where a boiler is fired with low sulfur content, the entrained particulate matter in the boiler flue gas has a high resistivity, for example, $10^{13}$ ohm-cm resistance and more, the most efficient removal of particulate matter by electrostatic precipitation requires that its resistivity be substantially lower; for example, on the order of about $10^8$ ohm-cm. When the resistivity of the particulate matter is high, for example, on the order of $10^{13}$ ohm-cm, the efficiency of electrostatic precipitation is substantially reduced. Thus, reduced efficiency in the operation of electrostatic precipitators with the flue gas from low-sulfur coals as a result of the higher resistivity of its flue gas particles can offset the reduced or potentially reduced air pollution sought through the use of the more expensive low-sulfur coals.

One solution to this problem has been to condition the boiler flue gas prior to its entrance into the electrostatic precipitator by the use of a conditioning agent to reduce the resistivity of the entrained particles within the boiler flue gas. Among the various chemicals which have been used as conditioning agents for boiler flue gas are water, anhydrous ammonia and various ammonia-bearing solutions, sulfuric acid, phosphoric acid and most commonly sulfur trioxide.

Sulphur trioxide flue gas-conditioning systems have included systems which store liquefied sulfur which is fed to a sulfur burner in which the sulfur is converted by combustion predominantly to sulfur dioxide. The systems then pass the sulfur dioxide to a catalytic converter which employs a vanadium pentoxide catalyst to convert the sulfur dioxide into sulfur trioxide. The sulfur trioxide created by such systems is piped to a nozzle system for injection into ducts carrying the boiler flue gas and its entrained particulate material to reduce the electrical resistivity of the flue gas particulate matter for removal by an electrostatic precipitator.

Sulfur trioxide conditioning systems have been proposed to condition the flue gas streams from more than one boiler with sulfur trioxide from a single conditioning agent source. For example, U.S. Pat. No. 4,333,746 proposes a flue gas conditioning system including a catalytic converter whose output is divided and connected through a system of conduits and control valves with two flue gas conduits carrying the flue gas from two boilers, and further including a separate purging system of conduits and control valves to direct a flow of purging air within the system.

The prior proposals for such multi-boiler flue gas conditioning systems have not been satisfactory. Individual boilers must be free to, and are likely to operate at, different capacities because of differing and variable electrical load requirements, operating problems or outages and the like, and each of their electrostatic precipitators face varying flue gas flow and particle conditions and must operate at high efficiencies at all times. A multi-boiler flue gas conditioning system must be able to provide separate, independently controlled flows of conditioning agent into each of the plurality of variable flue gas flows from the multiple boilers and accurately respond to varying load signals from the boilers, the turbines or their controls and provide variations needed to maintain high precipitator operating efficiencies and low flue gas opacities in the plurality of flue gas streams from the boilers. In addition, if one boiler must be shut down because of a forced power outage, the conditioning system must be able to enter a purge cycle to clear sulfur trioxide from the portion of the system carrying sulfur trioxide to the flue gas of the shut-down boiler without significantly altering the flow of conditioning agent to the other operating boilers.

In prior proposed multi-boiler flue gas conditioning systems, such as that proposed in U.S. Pat. No. 4,333,746, the catalytic converter providing the conditioning agent must be designed to provide the total maximum flow of conditioning agent for all of the boilers to which it is connected, and a separate additional air blower and heater must be provided for purging the system. Furthermore, the catalytic converter and the other apparatus providing sulfur dioxide to the catalytic converter have generally been assembled as a unit for shipping installation and operation, and the assembled $SO_3$-producing unit is not capable of location near multiple flue gas conduits leading from multiple boilers so that, in such prior multi-boiler systems, sulfur trioxide conditioning agent had to be carried through lengthy conduits and frequently over tortuous paths from the $SO_3$-producing unit to the injectors of the various flue gas conduits of the multiple boilers, thus requiring both extended warm-up times prior to the introduction of sulfur trioxide to remote flue gas conduits, because of the high acid dew point of $SO^3$ (550° F.-288° C.), and extended system purge times upon shut down of a boiler unit, and increased difficulty in purging long tortuous conduits of sulfur trioxide.

In addition, sulfur trioxide conditioning agent can be made at a single flow rate at any one time and the resulting single flow of sulfur trioxide must be divided among the multiple boilers depending upon the boiler load of each of the boilers, and the characteristics of the particulate matter generated by each of the boilers and of operation of each of the electrostatic precipitators; no successful system for such operation is known. Providing sulfur trioxide at a rate that is too low or too high to any one of the boiler conduits can result in ineffective operation of its electrostatic precipitator, and excessive stack emission, corrosion of system components and a blue acid plume.

Because of the problems above and others, prior multi-boiler flue gas conditioning systems have been inefficient, inflexible, expensive and generally ineffective. The multi-burner flue gas conditioning systems that have been tried have proven to be unsatisfactory in service and many have been abandoned. As a result, such multi-burner flue gas conditioning systems are no longer being offered and flue gas conditioning system suppliers are suggesting a separate flue gas conditioning system for each boiler flue gas stream.

DISCLOSURE OF THE INVENTION

This invention provides an improved apparatus and methods for the treatment of boiler flue gas with sulfur trioxide conditioning agent. The invention includes the beneficial use of catalytic converters that can be located immediately adjacent the injection site for their sulfur trioxide output, that can be individually sized and manufactured for variable required conditioning agent outputs, that can be individually controlled and can provide substantially improved conversion efficiency and that can provide an efficient, flexible, effective and relatively inexpensive multi-boiler flue conditioning system.

Such improved apparatus can comprise an integrated assembly adapted to provide a flow of air and sulfur dioxide and to be shipped and installed as a unit at an electrical generating facility, and a plurality of sulfur dioxide catalytic converters adapted for operation remote from the integrated assembly at a plurality of sites where sulfur trioxide is to be injected into the boiler flue gas. One example of a preferred integrated assembly can comprise a sulfur burner, a pump for liquified sulfur and an air blower connected with the sulfur burner, a system controller and the associated components and conduits known for sulfur burning flue gas conditioning systems. A plurality of catalytic converters may be installed remotely from the integrated apparatus and each such catalytic converter may be individually sized, manufactured and operated to provide the conditioning agent output needed at its injection site, whether for one of a plurality of injectors for the flue gas of a single boiler or for the injectors for the flue gas of one of a plurality of boilers.

In such apparatus, the integrated assembly can also comprise a first means for providing a flow of sulfur dioxide, a second means for providing a flow of heated air, a third means for mixing the flows of sulfur dioxide and heated air to produce a combined flow of sulfur dioxide and air at a temperature in excess of the condensation temperature of sulfurous acid, and a fourth means for supporting and carrying the first, second and third means. The integrated assembly may also include a means for dividing the flow of sulfur dioxide and air into a plurality of flows for direction to the plurality of catalytic converters.

In systems of the invention, each of the plurality of remotely located catalytic converters can be individually sized and manufactured to provide a specified maximum flow of sulfur trioxide to condition the flue gas from a single one of a plurality of boilers, and can be of substantially reduced size, having a conversion capacity limited to that needed at a single injection site. Furthermore, each of the plurality of catalytic converters can be a two-stage converter with interstage cooling to provide improved conversion efficiency and/or can be provided with a source of heat and/or air and individually controlled.

In another such system of the invention, the first means generates sulfur dioxide from liquified sulfur by pumping the liquified sulfur to a sulfur burner. An air blower provides a first flow of air to the sulfur burner and a second flow of air for combination with the sulfur dioxide generated in the sulfur burner, and the first and second flows of air from the air blower are heated with first and second heaters. Such a sulfur burning first means can provide heating energy to the sulfur burner for its conversion of sulfur to sulfur dioxide, and a substantially greater air flow can bypass the sulfur burner and can be used to dilute the sulfur dioxide output of the sulfur burner to a proper concentration for delivery to and $SO_3$ conversion at the plurality of sulfur dioxide conversion units.

Another preferred system of this invention provides sulfur trioxide conditioning agent to multiple flue gas streams of multiple boilers from a single sulfur dioxide source (hereafter referred frequently as a "cross-tie system"). The cross-tie system of this invention overcomes the disadvantages discussed above in regard to prior multi-boiler flue gas conditioning systems. In the preferred cross-tie system of the invention, there is no loss of control flexibility and each separate boiler flue gas stream is provided with a variable individual conditioning agent flow which can satisfy the desirable operating conditions of the electrostatic precipitator for the flue gas from that individual boiler. With the cross-tie system of this invention, the flue gas of any number of boilers can be conditioned using either $SO_2$ or elemental sulfur as feedstock sulfur source. A significant advantage of this system is its versatility, which is based on using or generating gaseous $SO_2$ and delivering gaseous $SO_2$ to a plurality of catalytic converters, with each catalytic converter being located adjacent site of injection of sulfur trioxide into the flue gas conduit of a different boiler. At each sulfur trioxide injection site, the $SO_2$ may be mixed with heated air, and sulfur trioxide ($SO_3$) may be generated at each of the separate catalytic converters to suit the individual needs of the flue gas streams from the individual boilers connected with the system. In systems of the invention, a sulfur furnace can supply $SO_2$ for conversion to $SO_3$ for a multiplicity of boilers and the difficult transmission of $SO_3$ can be avoided. Hot $SO_2$ generated at the sulfur furnace can be delivered long distances without risk of pipe corrosion.

Such preferred systems of the invention for conditioning a plurality of flue gas streams from a plurality of boilers can comprise means for providing a single flowing mixture of sulfur dioxide gas and air, means for dividing the single flowing mixture of sulfur dioxide gas and air into a plurality of flows of sulfur dioxide gas and air in a plurality of distribution conduits, with each of the distributing conduits extending from the dividing means to adjacent one of the plurality of flue gas conduits and an adjacent one of a plurality of catalytic converters for converting sulfur dioxide and air into sulfur trioxide conditioning agent. Each one of the plurality of catalytic converters is connected with a different one of the distributing conduits at its input end and with means to inject sulfur trioxide into one of the plurality of flue gas streams from one of plurality of boilers at its output end.

Other features and advantages of the invention will become apparent from the drawings and more detailed description which follows.

BEST MODE OF THE INVENTION

Figure 1:
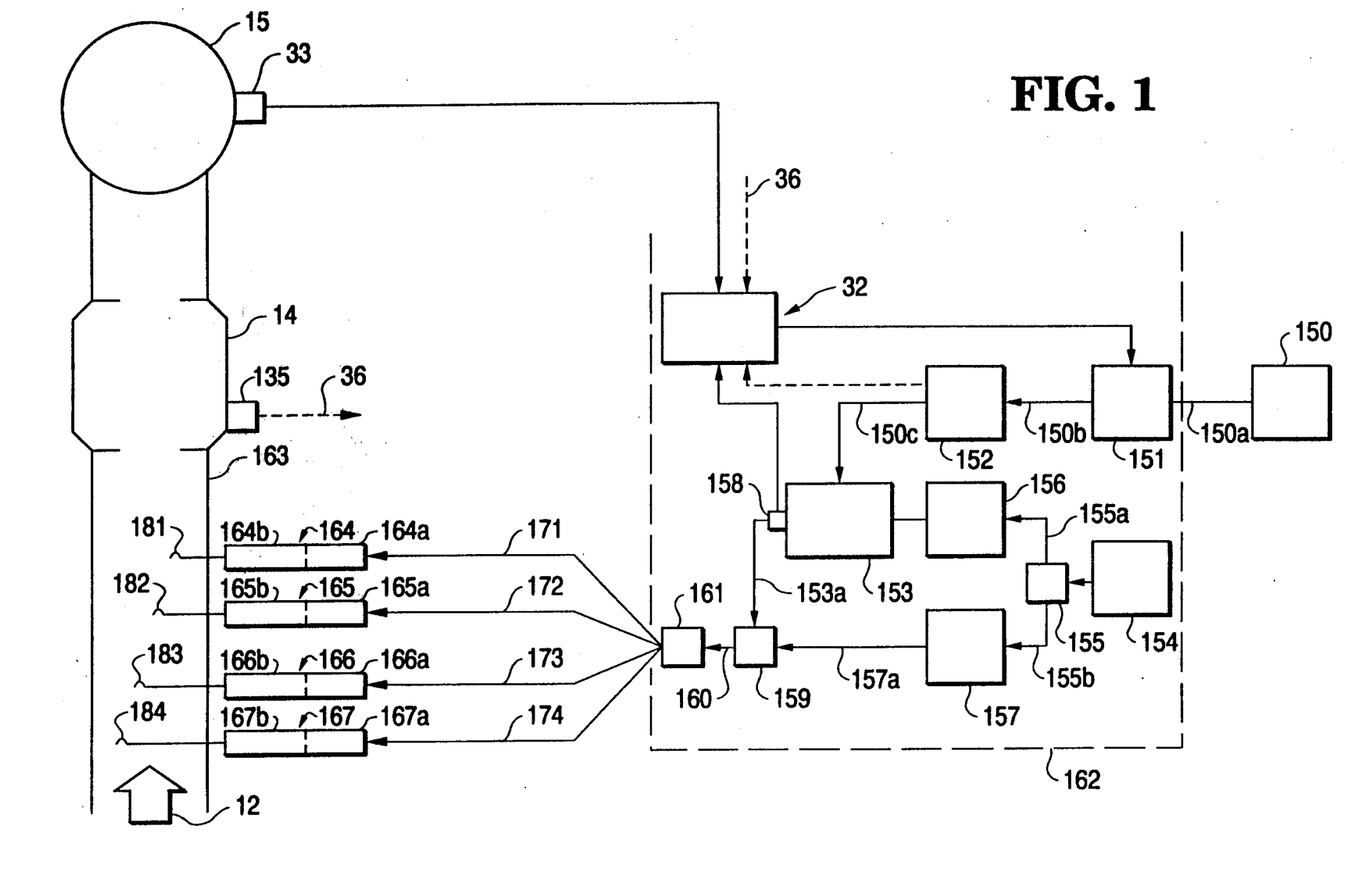
FIG. 1 is a diagrammatic drawing of a system of the invention.

FIG. 1 shows a system of the invention. The new system shown in FIG. 1 includes a source of liquified sulfur 150 which may include a concrete storage pit or a thermally insulated tank that is provided with heating elements to liquify the sulfur. In the system, liquified sulfur will be pumped by a metering pump 151 from the sulfur source 150 through steam-jacketed and thermally insulated pipes 150a–150c and a mass flow meter 152 (optional) to a sulfur burner, or furnace, 153 for combustion. The sulfur burner 153 can be a conventional sulfur furnace construction with a refractory lining and a brick checker work. Preferably, the sulfur burner of the system can be a spray burner in which the liquified sulfur is sprayed into the refractory furnace from one or more spray nozzles. Such spray burner systems provide more vigorous burning and more complete combustion than the conventional checkerwork furnaces, and the spray burner apparatus is smaller, less expensive and more easily controlled, and permits the burning of sulfur to be terminated quickly if necessary. The products of combustion of the sulfur, primarily sulfur dioxide, will be directed from the sulfur burner 153 through conduit 153a and mixed with air from conduit 157a, as described below.

The system shown in FIG. 1 includes a constant volume blower 154. The constant volume blower 154 provides a flow of air between two conduits 155a and 155b to air heaters 156 and 157. The air flow from blower 155 through conduit 155a is raised in temperature by air heater 156 to a constant temperature of 750° F. at the heater output and is directed into the sulfur burner 153 to raise the sulfur burner 153 to a temperature sufficient to burn sulfur, that is, approximately 750° F. A temperature sensor 158 at the output of the sulfur burner 153 is set to provide an operating signal to controller 32 when the temperature at the output of the sulfur burner exceeds 600° F. When controller 32 receives the signal from temperature sensor 158 indicating the air leaving the sulfur burner 153 exceeds 600° F., the controller 32 will be enabled to operate sulfur pump 151, as described in U.S. Pat. No. 5,032,154, to operate the system at minimal opacities and minimal sulfur flow rates. During operation of the system, controller 32 operates sulfur pump 151 to deliver liquified sulfur from sulfur source 150 through a flow meter 152 (which is optional) to sulfur burner 153. In sulfur burner 153, the sulfur is mixed with the air from air heater 156 and combusted to create combustion products, primarily $SO_2$, which are directed from the output of the sulfur burner 153 through conduit 153a.

The system of FIG. 1 requires no control of the temperature or of the volume of air introduced into sulfur burner 153 by blower 155 and air heater 156. Under all conditions of operation of controller 32 and sulfur burner 153, a constant flow of air at an effective burner input temperature of 750° F. can be introduced into sulfur burner 153. The air from blower 154 is split into conduits 155a and 155b in a constant proportion. The flow rate of air introduced into conduit 155a, air heater 156 and sulfur burner 153 is only that flow rate sufficient to burn sulfur and may typically be as low as 40 to 50 standard cubic feet per minute, which substantially reduces the power requirements for air heater 156. Blower 154 and divider 155 deliver a larger volume rate of the air into conduit 155b and heater 157, for example, about 850 standard cubic feet per minute, to mix with and dilute the sulfur dioxide leaving burner 153 at mixing junction 159. Air heater 157 raises the temperature of this larger proportion of air slightly, to about 100° F., a temperature sufficient to maintain the sulfur dioxide and air combination above the condensation temperature of sulfurous acid after mixing. The second flow of heated air is delivered through conduit 157a to a mixing junction 159 where it is mixed with the sulfur dioxide leaving sulfur burner 153 through conduit 153a. The combined air-sulfur dioxide mixture will then travel through conduit 160 to a flow divider 161.

Thus, the air from blower 154 is split between conduits 155a and 155b, with the air flow through air heater 156 and sulfur burner 153 being only five to ten percent of the air flow and with the remaining ninety percent of the air flow being directed through conduit 155b and air heater 157. This proportion will provide, upon mixing of the $SO_2$ from conduit 153a and the slightly heated air from conduit 157a, an air-$SO_2$ concentration suitable for conversion to sulfur trioxide.

In this preferred embodiment of the invention, the sulfur pump 151, flow meter 152, sulfur burner 153, blower 154, flow divider 155, air heater 156, air heater 157, conduits 150b, 150c, 153a, 155a, 155b, 157a and 160, mixing junction 159 and flow divider 161 may be supported and carried by a single supporting structure or means, which is indicated at 162, and can all be integrated into a single assembly which may be located remotely from the duct work 163 for the flue gas. The integrated assembly can also include an insulated and heated tank (as sulfur source 150) which is supported and carried with conduit 150a by the supporting structure 162. Such an integrated assembly may be conveniently built and tested at a production facility located distantly from the site of its installation and may be shipped as a unit for installation. In this preferred system, the temperature of the air-$SO_2$ mixture downstream of the mixing junction 159 need only be maintained in excess of the relatively low temperature at which the air-$SO_2$ mixture will condense to form sulfurous acid (about 180° F.). Conduit 160 for the air-$SO_2$ mixture may be mild steel pipe with sufficient thermal insulation to insure that the temperature of the air-$SO_2$ mixture remains above 180° F.

The system of FIG. 1 includes a plurality of sulfur dioxide conversion means, 164-167, preferably one for each $SO_3$-insertion site in conduit 163. The air-$SO_2$ mixture is divided by a flow divider 161 into a plurality of distribution conduits, 171-174, for delivery to the location adjacent the plurality of sulfur dioxide conversion means, 164-167, where it is heated to 800° F., converted to $SO_3$, and delivered to a plurality of $SO_3$ insertion devices 181-184. The distribution conduits 171-174 may also be mild steel pipe with sufficient insulation to insure that the temperature of the air-$SO_2$ mixture will remain high enough (about 180° F.) to avoid condensation.

Each of the plurality of sulfur dioxide conversion means 164-167 includes a small heater, 164a-167a, respectively, and a small catalytic converter 164b-167b, to convert sulfur dioxide into sulfur trioxide immediately adjacent the plurality of insertion probes 181-184. The air-$SO_2$ mixture in each of conduits 171-174 is directed into the small heaters 164a-167a, which includes self-contained temperature regulators to raise the output temperature of the air-$SO_2$ mixture to 800° F., prior to its entry into the plurality of catalytic converters 164b-167b where the $SO_2$ is converted to $SO_3$ and immediately injected into duct work 163 through the injection devices 181-184.

In the system of FIG. 1, blower 154 must only be operated a short time after system shut down to purge the system of sulfur trioxide. Because of the immediate adjacency of the catalytic converters 164b-167b to their associated injectors 181-184, the reduced volume and surfaces to be purged and the parallel and simultaneous purging of the catalytic converters and their associated injectors, such systems may be purged quickly.

Figure 2:
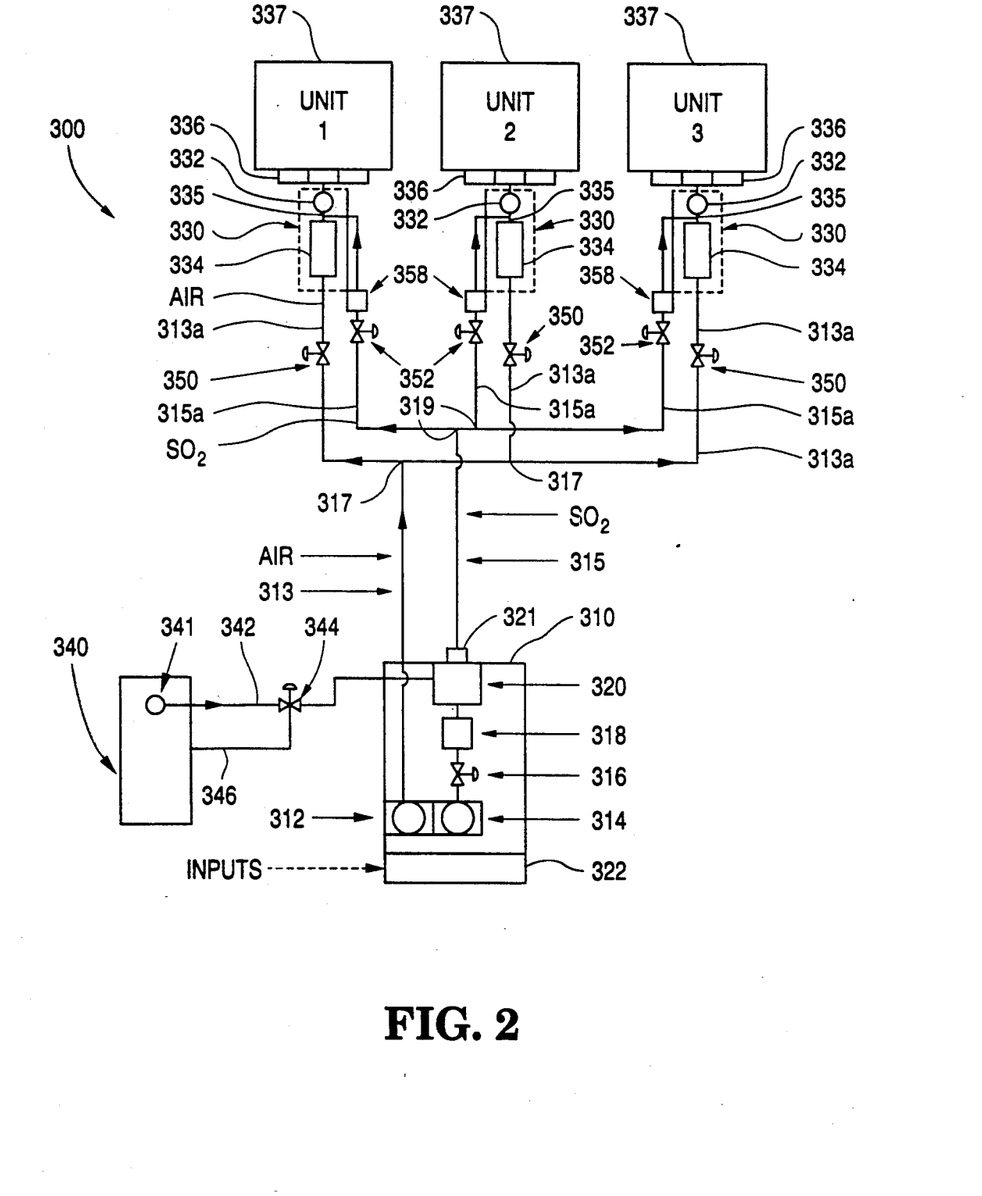
FIG. 2 is a diagrammatic drawing of another system of this invention.
Figure 3:
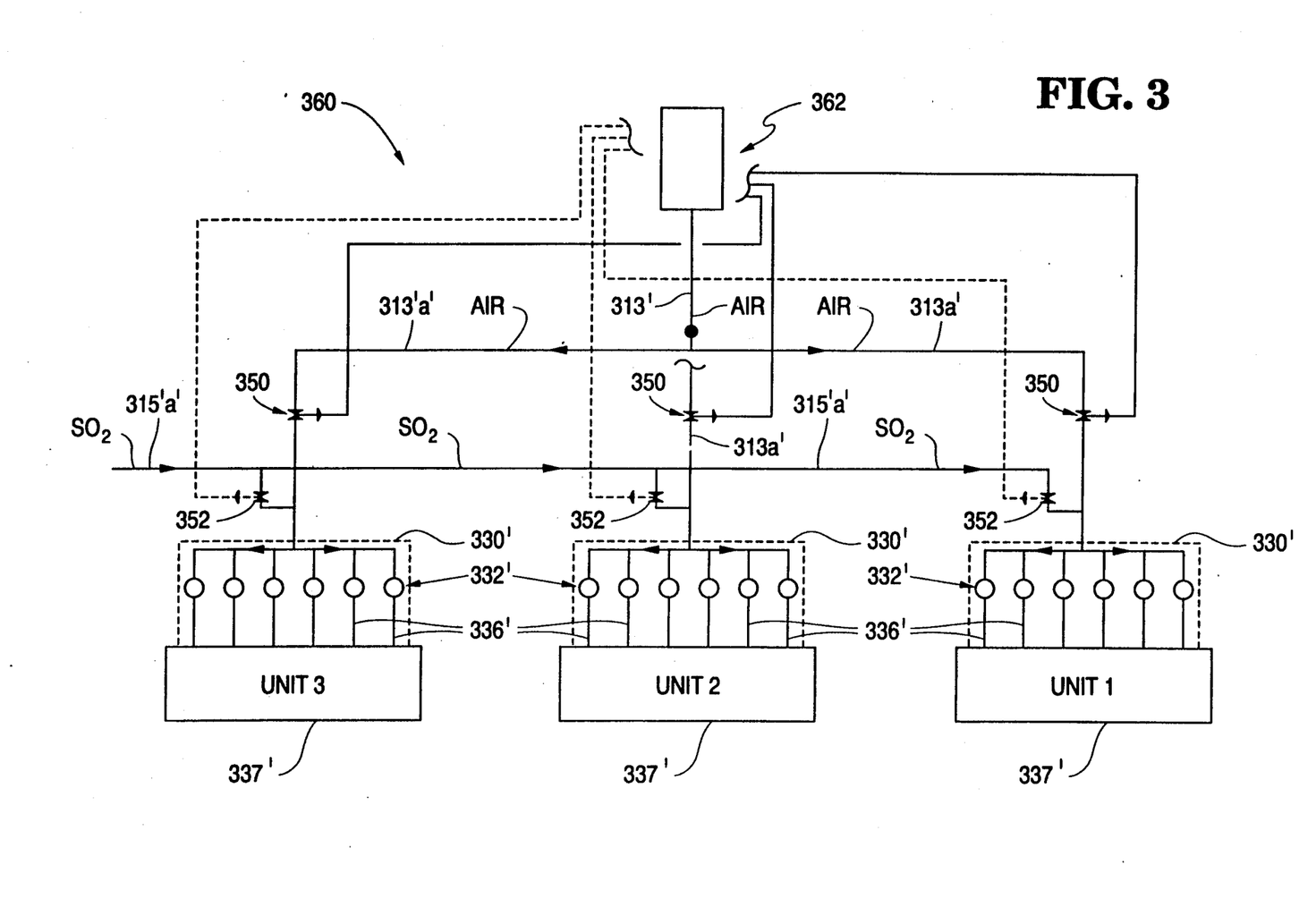
FIG. 3 is a diagrammatic drawing of still another system of this invention.

FIGS. 2 and 3 are diagrammatic drawings to illustrate cross-tie systems of the invention for conditioning a plurality of flue gas streams from a plurality of boilers or generating units including a sulfur source (e.g., 320) for providing a single flowing mixture of sulfur dioxide and air, one or more flow dividers (e.g., 319) for dividing the single flowing mixture of sulfur dioxide and air into a plurality of flows of sulfur dioxide and air in a plurality of distributing conduits 315, 315a, and a plurality of catalytic converters 332, 332' connected with the distributing conduits at their input ends and with injectors 336, 336' to inject sulfur trioxide into the plurality of flue gas conduits 337, 337' for a plurality of boilers or generating units.

As shown in FIGS. 2 and 3, such systems can include a blower 312 for providing a single flow of air, one or more air dividers 317 dividing the flow of air into a plurality of flows of air in a plurality of air distributing conduits 313a, and a plurality of air heaters 334 having their inputs connected with the air distributing conduits 313a and their outputs connected with the inputs 335 of the catalytic converters. As indicated in FIGS. 2 and 3, each one of the plurality of catalytic converters 332 and an associated one of the plurality of air heaters 334 can form a sulfur dioxide conversion assembly 330 which is located adjacent one of the conduits 337 of generating units 1-3, and the distributing conduits for sulfur dioxide and for air 315a extend to the sulfur dioxide conversion assemblies 330 near each generating unit conduit 337. In addition, the flow of sulfur dioxide and air to each of the catalytic converters 332 is controlled by a controllable flow control valve 352 connected in each distributing conduit 315a for sulfur dioxide. Each of the controllable flow control valves 352 is operated by a controller 322 that is connected with sensors installed for each generating unit (not shown) and its precipitator and/or other such sensors that are used to determine the need for conditioning agent, as well known in the art. The electrical connections between controller 322 and the other components of the system, such as the sensors, meters, controller valves, heaters and blowers described herein, are not shown to simplify the drawings.

In each of the systems of FIGS. 2 and 3, the sulfur trioxide is mixed with the boiler flue gas of each unit 1-3 and its entrained particulate matter to condition its particulate matter for removal by an electrostatic precipitator before the flue gas is emitted into atmosphere from the stack.

As indicated above, FIGS. 2 and 3 illustrate further embodiments provided by this invention for providing flue gas conditioning agent for multiple boilers or generator units from a single $SO_2$ generating source. As shown in FIG. 2, such a system 300 can include one $SO_2$ generator skid 310, a separate $SO_2/SO_3$ converter assembly 330 for each of the generator units 1, 2 and 3, a feedstock storage means 340 connected to the $SO_2$ generator skid 310, and a plurality of control valves 350, 352 and mass flow meters 358.

The $SO_2$ generator skid 310 can include a process air blower 312 that is equipped with variable speed drive, and a furnace blower 314 equipped with a controllable automatic valve 316, an air heater 318, which may be either electrical or gas-fired, for the furnace air from blower 314, a sulfur furnace 320, and a control 322.

The process air blower 312 is equipped with variable speed drive and supplies air to the individual $SO_2/SO_3$ converter stations 330. The size of the process air blower 312 is selected to provide about fifty percent (50%) of the total air volume needed to generate $SO_3$ conditioning agent for all of the generator units 1-3, and the variable speed drive of blower 312 allows air volume to be varied to meet the variable operation needed to satisfy the flue gas condition requirements of the boiler or generator units in service, and to maintain high $SO_2/SO_3$ conversion efficiency as the $SO_3$ demand varies.

The furnace blower 314 is connected to a controllable automatic valve 316 for controlling the air flow to sulfur furnace, and is controlled to deliver that amount of air to the sulfur furnace 320 for sulfur combustion and an $SO_2$/air mixture with an approximately ten percent (10%) maximum $SO_2$ concentration. The output of furnace blower 314 can be varied to deliver the desired $SO_2$ concentration and to minimize the energy consumed by the system 300. The outputs of process air blower 312 and furnace blower 314 are combined at the converter inlet 335, and the process air blower 312 cooperates with furnace blower 314 to deliver an $SO_3$ air mixture to the probes 336 at a concentration of approximately two to six percent. The furnace air heater 318 raises the air provided by the furnace blower 314 to a temperature of approximately 700° F. to initiate sulfur combustion within the sulfur furnace 320 as sulfur spontaneously ignites at this temperature range. When a sufficient amount of sulfur is burned to maintain a desirable furnace temperature, control 322 deactivates the furnace heater 318. At high $SO_2$ concentrations, the furnace heater 318 may be deactivated as the sulfur combustion process itself supplies all the heat needed for the process to be self-sustaining.

Sulfur furnace 320 may be a spray burner type or multiple ball-type furnace. The specific design of sulfur furnace 320 is dependent upon the required $SO_3$ output of the system. The sulfur furnace is preferably sized to produce the maximum rate of $SO_2$ needed to provide the maximum expected consumption of $SO_3$ conditioning agent for all of the generator units tied in with the cross-tie system. For example, if each of the three generator units 1-3 may require 20 ppm $SO_3$, the sulfur furnace 20 will be designed to produce sufficient $SO_2$ for conversion to supply $SO_3$ with a concentration of 60 ppm, plus an operating margin. The sulfur furnace 320 preferably operates to produce an output of $SO_2$ in air at about ten percent maximum concentration.

Control means 322 can include the total system controls, MCC, local power supplies, and the like. A fully automated control for all of the components making up the cross-tie system, plus full control of the $SO_2$ generating skid 310, can be made available at the skid 320. Alternatively, controls for the components and systems can be provided remote from the $SO_2$ generating skid 310.

Each $SO_2/SO_3$ converter assembly 330 can include an electric or gas-fired heater 334 and one or more $SO_2/SO_3$ catalytic converters 332. The output of each $SO_2/SO_3$ converter assembly is connected with injection probes 336, which accommodate the size of the flue gas conduit 337 of each boiler or generator unit. The $SO_2/SO_3$ converter 332 can have an $SO_2/SO_3$ conversion efficiency rate of 94 to 98 percent, and high efficiency converters with a conversion rate efficiencies greater than 98 percent can be used, with two converter beds with inter-bed cooling.

As shown in FIGS. 2, sulfur source 340 is connected to $SO_2$ generator skid 310 and supplies liquified elemental sulfur for combustion directly to furnace 320. As noted above, however, the sulfur source feedstock suitable with this invention may be provided by liquid or gaseous $SO_2$. The storage and handling of the feedstock is effected by well-known methods as described above.

Control valves 350 provided in the process air distribution conduits 313a from the process air blower 312 control the amount of process air entering the individual $SO_2/SO_3$ converter assemblies 330. Control valves 352 provided in the $SO_2$ distributing conduits 315a from the sulfur furnace 320 control the amount of $SO_2$ delivered to the individual $SO_2/SO_3$ converter assemblies 330. Mass flow meters 358 can be provided in the $SO_2$ distributing conduits 315a to measure the flow rate of $SO_2$ delivered to each $SO_2/SO_3$ converter assembly 330.

The converter heaters 334 can heat the air provided by the process air blower 312 via distribution conduits 313a to a temperature of about 800° F. This process air passes through the converter 332 and the probes 336 and heats the components of the converter station 330 to a temperature suitable for $SO_2/SO_3$ conversion. Converter 334 is preferably located close to the converter inlet 335 to conserve energy and reduce the warm-up time. The $SO_2/SO_3$ converters assemblies 330 are preferably located immediately adjacent the probes 336.

The cross-tie systems of FIGS. 2 and 3 employ two process supply conduits for each boiler or generator unit in the system. First, one conduit 313 delivers air from the process air blower 312 to one or more air dividers 317, which divide the flow of process air into a plurality of flows in a plurality of air distributing conduits 313a which extend from the divider to each $SO_2/SO_3$ converter assembly 330 adjacent the flue gas conduits 337 for each unit. The conduits for process air 313 and 313a can be provided by uninsulated carbon steel piping.

Second, hot $SO_2$/air from the sulfur furnace 320 is delivered through a single conduit 315 to another divider (or dividers) 319, which divides the flow of $SO_2$/air mixture into a plurality of flows of $SO_2$ in a plurality of distributing conduits 315a, which extend from dividers 319 to each $SO_2/SO_3$ converter assembly 330 adjacent the flue gas conduits 337. $SO_2$ supply conduits 315 and 315a and dividers 319 are preferably constructed of insulated stainless steel. Dividers 317 and 319 are preferably located on skid 310.

Initially, each converter assembly 330 receives the same volume of process air from the blower 312. Subsequently, the volume of process air delivered to each converter station 330 may be individually controlled by control valves 350. The furnace blower 314 is a constant volume blower with an automatic control valve 316 controlled to generate desirable $SO_2$/air concentrations for conversion to $SO_3$. The flow rate of $SO_2$ supplied to the individual $SO_2/SO_3$ converter assemblies 330 is individually controlled by control valves 352 and is metered by mass flow meters 358.

The delivery of sulfur from feedstock source 340 to the sulfur furnace 320 is accomplished via delivery line 342 and may be controlled by control valve 344. Sulfur source 340 includes a controllable pump 341 to provide a continuous flow of sulfur into delivery line 342. In the event sulfur is not needed at sulfur furnace 320, control valve 344 may be closed and the sulfur is recirculated via line 346 back into the feedstock storage 340.

The cross-tie conditioning system of this invention described above has four operating modes: Warm-up; Ready; Process; and Off. In the initial "Warm-Up" mode, the system is prepared from a cold start for the production of $SO_2$, with a condition at "Ready" where the operating temperatures are sufficient for sulfur burning but where no $SO_2$ is being produced. In the "Process" mode, $SO_2$ is being produced from a combustion of sulfur in the sulfur furnace 320. If no conditioning agent is required, the sulfur furnace 320 may go into the Ready mode where the temperatures are sufficient for sulfur combustion, but where no $SO_2$ is being produced, as noted above. In the "Off" mode, the supply of sulfur from feedstock source 340 is discontinued, the furnace blower heater 318 and the furnace blower 316 are shut down.

Process air to the $SO_2/SO_3$ converter assemblies 330 is also controlled in the four operating modes of the system. In the Warm-up to Ready mode, where the system is activated from a cold start, process air is heated and delivered to the inputs of the catalytic converters 332, and the converters 332 and injection probes 336 are brought to temperatures suitable to $SO_2/SO_3$ conversion and injection without condensation of $SO_3$ gas in the catalytic converter 332 and associated $SO_3$ transport conduits and injection probes 336. In the process mode, the $SO_2/SO_3$ conversion assemblies 330 are converting $SO_2$ to $SO_3$ and delivering the $SO_3$ through the injection probes 336 in response to the need for conditioning agent in each flue gas conduit 337 for each boiler generator unit of the system.

In the Purge mode, the flow of $SO_2$ from sulfur furnace 320 is discontinued, but the process air blower 312 and air heaters 334 remain activated to deliver heated air through the $SO_2/SO_3$ converter assemblies 330 and injection probes 336 to thereby remove $SO_3$ from each converter 332 and its associated conduits and probes. An acceptable "purge" may be accomplished in 60 to 90 minutes.

After the Purge cycle has been completed, the process air loop is shut down and the system is in the "Off" mode.

Both the cross-tie sulfur furnace operating loop and the process air operating loop can be provided with emergency stop (E-Stop) switches on the control panel for emergencies. A plant controller 322, which may be located at the skid 310 or a remote station, can automatically control all of the operations of the cross-tie conditioning system 300. The sulfur furnace 320 supplies $SO_2$ for all of the operating boiler or generator units 1–3, but the system is operated to achieve individually controlled $SO_3$ production for the operating needs of each boiler or generator unit.

To activate system 300 and to begin the "Warm-up" mode, both blowers 312 and 314 are activated at the $SO_2$ generator skid 310. During the Warm-up mode, the process air blower 312 delivers equal amounts of process air to each of the three converter stations 330. The flow of the process air is controlled by control valves 350 provided in each of the air distributing conduits 313a. If desirable, an automated valve (not shown) may also be provided at the process air blower 312 to control its flow. The conversion assembly air heaters 334 are also activated, and the process air temperatures at the outlets of converters 332 is continuously increased until they reach an acceptable operating temperature of approximately 800° F. and until the inlet temperatures at the injection probes 336 exceed 600° F.

At this point, the furnace blower 314 is activated and begins providing a flow of air, controlled by automatic control valve 316, to sulfur furnace 320 for sulfur combustion. The furnace air heater 318 is also activated and brings the furnace air and furnace temperature to an acceptable operating temperature of approximately 700°–800° F.

When all set point temperature alarms are clear, i.e., when all of the temperatures are at operating levels, the system is then ready to burn sulfur and provide $SO_2$ to the $SO_2/SO_3$ converter assemblies 330. The system is then in the "Ready" mode.

The system 300 is now ready to begin the "Process" mode upon command. Upon being activated, the sulfur pump 341 pumps sulfur from feedstock storage 340 to sulfur furnace 320 through delivery line 342 and valve 344 to be burned at a rate to accommodate the total demand for conditioning agent by each precipitator (not shown in FIGS. 2 and 3) associated with each flue gas conduit 337. Load demand is measured by summing individual unit load signals generated, for example, by conventional 4–10 ma. control signals derived from steam flow, boiler load, electric power demand and the like from each boiler or generator unit in the system. The need for conditioning agent for the flue gas of each of the boilers or generator units in the system may be determined by monitoring one or a combination of the following: fly ash resistivity; precipitator power consumption; concentration of $SO_2$ in the flue gas emitted into the atmosphere; and/or opacity of the stack effluent.

The control means 322 of the conditioning system considers the sulfur as a fuel so that the sulfur combustion at sulfur furnace 320 can be controlled by two established fuel-control principles. In this case, the two "fuels" may be elemental sulfur (which generates 4,000 BTUs/pound), and the furnace heating energy added to the sulfur furnace 320 by air heater 318, for example, by electrical energy, fuel oil, or gas. Thus, as the conditioning agent demand for the connected units 1–3 increases, more sulfur is delivered to and burned by sulfur furnace 320 and less added energy is required to maintain furnace operation at an acceptable operating level. Where conditioning agent demand and the associated burning of sulfur can maintain a satisfactory operating temperature of the sulfur furnace 320, the control means 322 deactivates the furnace heater 318 as no additional heat is required. When conditioning agent demand decreases, the furnace air heater 318 is energized by control means 322 to maintain the temperature of the sulfur furnace 320 at an acceptable operating level. Such a method of two fuel combustion control is simple and economic, and does not require accurate measurement of elemental sulfur consumption at the sulfur furnace 320.

The $SO_2$ generated by the sulfur furnace 320 flows via distribution conduits 315, 315a to each $SO_2/SO_3$ converter assembly 330. Each of the plurality of flows of $SO_2$ through each of the plurality of distribution conduits 315a is controlled by a control valve 352 to provide the conditioning agent needed for effective operation of the electrostatic precipitator of each boiler or generating unit. The flows of $SO_2$ and heated process air are controlled so they may be combined to provide a correct mixture of $SO_2$ and air at the correct temperature at each converter inlet 335 of each $SO_2/SO_3$ converter assembly 330 for effective $SO_2/SO_3$ conversion.

Operation of each of the systems to supply conditioning agent to each of the flue gas conduits 337 is preferably effected by controller 322 and one or more of conditioning agent demand control apparatus like that disclosed in U.S. application Ser. No. 07/882,835, the disclosure of which is hereby incorporated herein by reference. The combination of such conditioning agent demand control apparatus in this invention permits a determination of a satisfactory resistivity condition of the particulate matter collected within each electrostatic precipitator associated with each flue gas conduit 337, and may permit closing of one or more control valves 352 for periods of several hours. In such systems, the control means 322 for the system can be connected with the electrostatic precipitator control of each boiler or generator unit in the system, which can be adapted to sense a discharge rate of a charged precipitator electrode as disclosed in U.S. patent application Ser. No. 07/882,835.

Other control means can be used, however, for the system. For example, for each connected boiler or generator unit the control means 322 can monitor the operation of its electrostatic precipitator and the opacity of the flue gas emitted from its stack. To this end, control means 322 can be coupled to each electrostatic precipitator control in the system and determine the power used by each electrostatic precipitator in removing particulate matter from the flue gas. Control means 322 can also be coupled to each opacity meter in the system and determine the opacity of the effluent from each stack. Control means 322 may thus determine changes in the opacity of the effluent from each stack that accompany such transient conditions as boiler upsets due to the incomplete combustion of coal or carbon carry-over from coal combustion, ash-handling problems, precipitator rapping, boiler soot blowing and other such transient changes in operation which cannot be corrected by $SO_3$-conditioning methods and provide a conditioning agent demand signal for operation of assembly 20 as disclosed, for example, in U.S. Pat. No. 5,032,154.

In operation of the system, the $SO_2$ flow to each $SO_2/SO_3$ converter assembly may be determined by its associated mass flow meter 358, each of which may be connected to controller 322.

A controller suitable for inclusion in control means 322 is Allen-Bradley's T30 Plant Floor Terminal Programmable Controller, or Bristol-Babcock's Network 3000 Compatible Intelligent Controller, but other equivalent programmable controllers can also be used. Indeed, control means 322 can be provided by a programmable microprocessor and random access memory.

The operation of each $SO_2/SO_3$ converter assembly 330 can be effected as follows. As noted, $SO_2$ flow can be measured by mass flow meters 358 and controlled by control valves 352 in response to unit load and trim signals. Mass flow meter 358 can measure the $SO_2$ flow rate and direct this information to control means 322, which then compares the measured $SO_2$ flow rate with the temperature required at the converter inlet 335 by using look-up tables stored in its memory. Depending on the $SO_2$ concentration and the flow rate of the process air, the control means 322 operates the converter heater 334 to adjust the air temperature entering the converter 332 to effect efficient $SO_2/SO_3$ conversion. As more $SO_2$ is directed into the $SO_2/SO_3$ converter assembly 330, the process air control valve 350 will be operated to provide a correct $SO_2$/air mixture for conversion, and the output of converter heater 334 can be adjusted to improve $SO_2/SO_3$ conversion. If desirable, the volume of process air blower 312 can also be reduced while maintaining preferred $SO_2$ concentrations at the converter inlets 335 to reduce energy consumption by the system 300. As described above, each converter station 330 works independently of the others in effecting $SO_2/SO_3$ conversion for proper conditioning of the flue gas from the power plant unit to which it is adjoined.

In the event $SO_3$ is no longer required for conditioning a boiler or generating unit because of unit load and/or favorable precipitator operating conditions, the $SO_2$ control valve 352 closes, thereby discontinuing the generation of $SO_3$. As this point, the process air control valve 350 opens fully and the system 300 is in the Purge mode where hot air flows through the converter assembly 330 and connected injectors 336 and the station remains in a Ready state with set point temperatures suiting $SO_3$ production. In this "Ready" mode, $SO_3$ can be made at once upon command. Because one or more of the converter stations is no longer generating $SO_3$, the control means 322 reduces the total demand for $SO_2$ to match the new lower $SO_2$ requirement, and less sulfur is therefore admitted into and combusted in the sulfur furnace 320.

When any one of the boilers or generating units is shut down and its supply system is in the "Purge" cycle, hot process air from process air blower 312 is directed through its $SO_2/SO_3$ converter assembly 330 at temperatures of approximately 800° F. and above. During this cycle, its converter heater 334 is activated to maintain the elevated temperature of the process air as it flows through the converter assembly 330 and connected injection probes. When the purge cycle ends, the converter heater 334 is deactivated, the process air control valve 350 is closed and a vent valve (not shown) located at the converter inlet 335 is opened, all by control means 322. At this point, the individual $SO_3$ converter assembly 330 is out of services and control means 322 consequently reduces the variable speed drive output of the process air blower 312 to allow for the reduced demand for process air. The output of the sulfur furnace 320 is thus continually varied to generate a sufficient amount of $SO_2$ to suit the demands of one or a combination of all of the power-generating units in the cross-tie system of this invention.

FIG. 3 shows a further embodiment of a cross-tie flue gas conditioning system provided by this invention. While FIG. 3 shows three power-generating units, units 1-3 as an example, any number of power-generating units can be tied in with and conditioned by the cross-tie conditioning system of this invention just like the system of FIG. 2. In contrast to the cross-tie embodiment shown in FIG. 2, the cross-tie system 360 shown in FIG. 3 uses $SO_2$ as a source of sulfur, compared with system 300 of FIG. 2 which uses elemental sulfur as the feedstock and a sulfur furnace to convert it to $SO_2$. The cross-tie system 360 using $SO_2$ is of similar design to sulfur-burning cross-tie system 300 of FIG. 2 except that $SO_2$ from a source of liquid $SO_2$ is piped as a gas directly to each of the $SO_2$ control valves 352. The $SO_2$ control valves 352 meter $SO_2$ into the converter station 330'. System 360 further includes an equipment skid 362, which can carry a variable speed drive process air blower (not shown), as described above in relation to process air blower 312 in FIG. 2. This process air blower directs process air through air distribution conduits 313' and 313a', which are preferably constructed of uninsulated carbon steel. The $SO_2$ is delivered to the $SO_2/SO_3$ converter stations 330' through distributing conduits 315' and 315a', which are preferably constructed of insulated stainless steel piping. As before, each of the $SO_2$ control valves 352 is independently controlled by a control means as described above to provide the desired $SO_3$ conditioning agent for each of the power-generating units 1-3. The operating mode of system 360 is similar to that of the sulfur-burning system 300, described in relation to FIG. 2 and a detailed discussion will not be presented. In the system 360 of FIG. 3, the $SO_2$ feedstock is preferably stored in liquid state in a remote storage facility (not shown) and can be vaporized at the storage facility or at the skid 362.

Each of the $SO_2/SO_3$ converter assemblies 330' can include a plurality of $SO_3$ injection probes 336' and, in this embodiment, a separate $SO_2/SO_3$ converter 332 can be provided for each of the plurality of injection probes 336'. If desired, however, a single converter 332 may be provided to supply conditioning to all of the injection probes 336' situated in the flue gas conduits of power-generating units 1-3.

The cross-tie conditioning system of this invention shown and described in relation to FIGS. 2 and 3 have the same flexibility and control as individual $SO_3$ generating plants, and their designs are simple, flexible and economical.

The invention thus provides an improved apparatus for conditioning boiler flue gas with sulfur trioxide for removal of entrained particles with an electrostatic preciptator. One such improved apparatus includes an integrated assembly adapted for providing a flow of air and sulfur dioxide at a temperature in excess of the condensation and temperature of sulfurous acid. The integrated assembly includes first means for providing a flow of sulfur dioxide, second means for providing a flow of heated air, third means for dividing the flows of sulfur dioxide and air into a plurality of flows of sulfur dioxide and air for conversion to sulfur trioxide and injection into the boiler flue gas at a plurality of injection sites upstream of the electrostatic precipitator, and fourth means for supporting and carrying said first, second and third means as an integrated assembly. In a preferred integrated assembly of such apparatus, the first means comprises a sulfur burner having a sulfur input and air input and a sulfur dioxide output, and an insulated conduit interconnecting the sulfur burner with a sulfur dioxide flow divider, an air blower and air flow divider connected with the air blower and having a plurality of first outputs.

Figure 4:
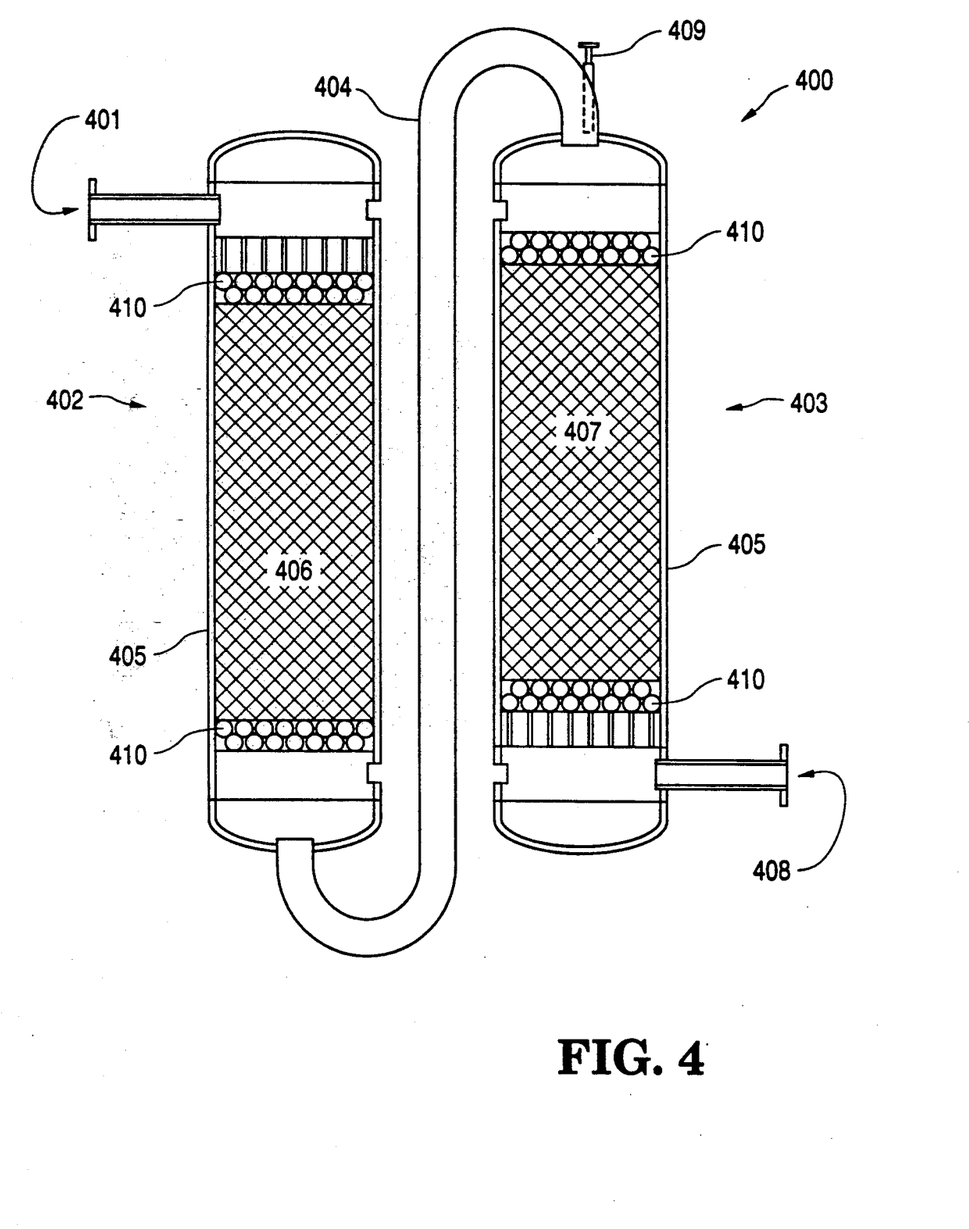
FIG. 4 is a cross-sectional view through the center of a catalytic converter adapted to supply a single injection site in system of the invention.
Figure 5:
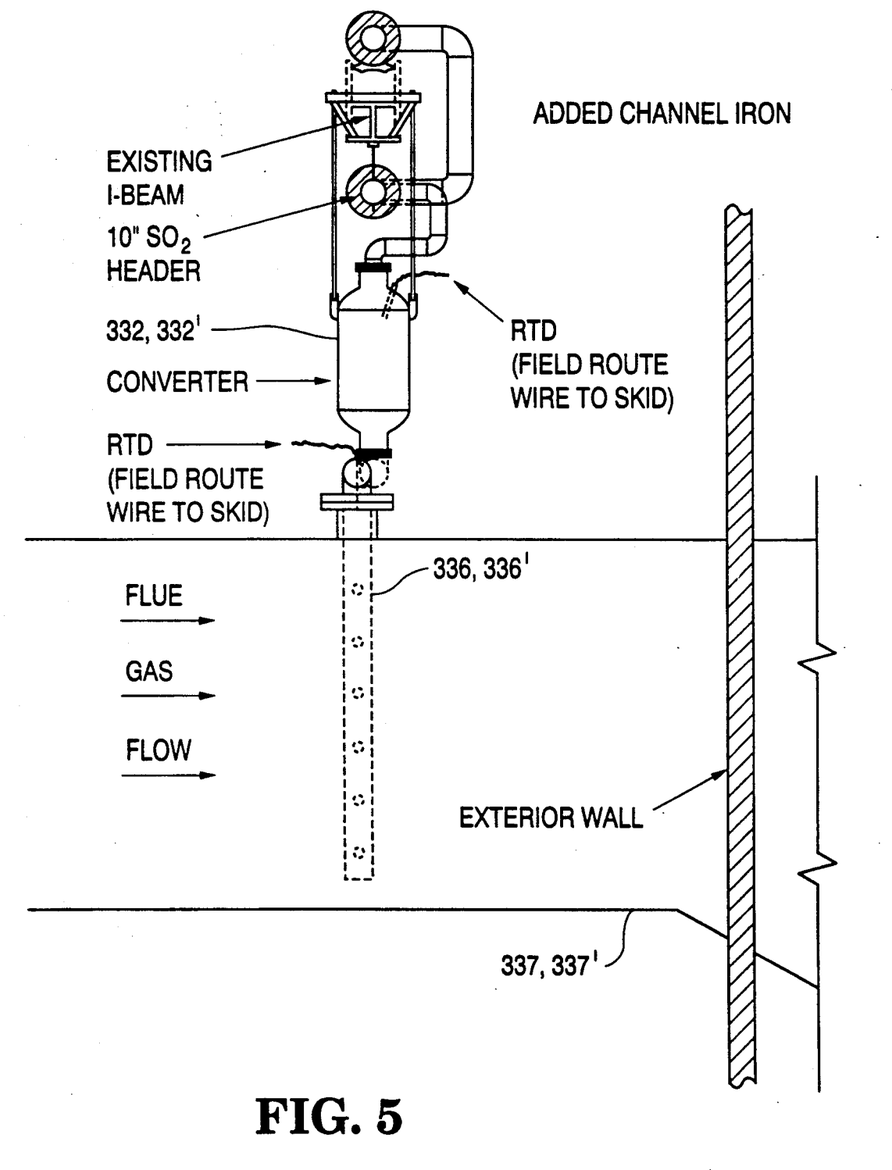
FIG. 5 is a drawing illustrating an example of an installation of a catalytic converter at an injection site for a flue gas conduit.

In such apparatus, one or more sulfur dioxide conversion assemblies, such as the two-stage catalytic converters 400 shown in FIG. 4, may be located remotely from the integrated assembly adjacent the injection sites and away from work areas. In the improved apparatus, a plurality of such compact sulfur dioxide conversion assemblies can be adapted for support and location remote from the integrated assembly adjacent a plurality of flue gas conduits at injection sites for sulfur trioxide upstream of their electrostatic precipitators. An example of such installation is shown in FIG. 5. Each such sulfur dioxide converter (as shown, for example, in FIG. 4) is adapted for connection with one of the plurality of flows of sulfur dioxide and air. The heaters and catalytic converters have a physical size and a heating and conversion capacity permitting their close location to one of the injection sites for sulfur trioxide.

FIG. 4 shows an example of a two stage $SO_2$ conversion assembly 400 that may be used in the invention. As shown in FIG. 4, the catalytic converter includes an inlet 401 which may be connected with a flow of sulfur dioxide and air from a distributing conduit 315a as described above. The two stage $SO_2$ conversion assembly 400 comprises a first stage catalytic converter 402 and a second stage catalytic converter 403 interconnected with a cooling conduit 404. Each catalytic converter 402, 403 can comprise an identical cannister 405 constructed of a stainless steel, which may have a diameter of six to eight inches and a length of 18-24 inches. Each catalytic converter 402, 403 contains a catalyst bed 406, 407 of vanadium pentoxide which has been applied to ceramic substrates, as well known in the art. The catalyst is held in the catalytic converter by foraminous spacers 410 and 411, as shown in FIG. 4. An output 408 extends from the second stage canister 403 and is adapted to be connected to one or more injection probes. The catalytic converter shown in FIG. 4 may, of course, be made larger or smaller cannisters 405 and catalyst beds and with different size cannisters 405 for each stage to accommodate its application. As shown in FIG. 4, two such catalytic converter canisters 405 may be interconnected with an intervening cooling conduit 404 to provide two-stage conversion of $SO_2$ to $SO_3$. In the two-stage conversion apparatus of FIG. 4, the intervening cooling loop can be designed to provide, corresponding to the temperature rise in the first stage cannister 402 due to the exothermic catalytic conversion $SO_2$ to $SO_3$, an interstage temperature reduction of, for example 160°-200° F. In addition a temperature sensor 409 may be placed in the interstage conduit 409 and connected with the controller 322 for control of the interstage temperature. The interstage cooling may be provided with a single conduit loop or may require a small heat exchanger in the interstage connectors.

FIG. 5 shows an exemplary installation of a small remote catalytic converter 332, 332' adjacent a flue gas conduit 337, 337'. Of course, because of the flexibility resulting from the small and convenient catalytic converter sizes used in the invention, the method of installation is not limited to that shown in FIG. 5.

Systems of the invention, including the new control methods and apparatus, are uncomplicated, are capable of an effective supply of sulfur trioxide for conditioning boiler flue gas prior to its passage through an electrostatic precipitator, and are controllable to maintain minimal opacity of the flue gasses that pass into atmosphere from the boiler stack. The invention provides a non-complex, direct system for providing minimal opacity of stack effluents and minimal pollution from boiler flue gas particulate matter in installation with a plurality of boilers and power-generating units.

For example, the process air lines 313, 313a, 313' and 313a' can be made of uninsulated carbon steel to reduce construction costs. The system 300 can utilize the heat generated by sulfur combustion for much of the heat necessary to generate $SO_2$ at satisfactory temperatures, thereby reducing the need for activating furnace heater 318 and the overall energy consumed by system 300. The $SO_2$-generating skid 310, shown in FIG. 2, and the equipment skid 362, shown in FIG. 3, can be located virtually anywhere in relation to the boilers or power-generating units, thereby providing ease and versatility in the installation of the cross-tie system 300. Further, in system 300, the converter heaters 334 can be arranged near the catalytic converters 332 in assemblies to conserve energy and reduce warm-up times. Similarly, the $SO_2/SO_3$ converter assemblies 330 and 330' can be arranged near the $SO_3$ injection probes for each unit to minimize the distance and reduce the energy necessary to operate the system at suitable operating temperatures, and each individual $SO_2/SO_3$ converter assembly can include one or more $SO_2/SO_3$ converters in a simple assembly providing efficient two-stage conversion at $SO_2$ to $SO_3$, other such important features and advantage are apparent from the drawing and foregoing description of the invention.

While presently preferred embodiments and other less preferred embodiments of the invention are described above, those skilled in the art will recognize that other embodiments are possible without departing from the scope of the following claims.

What is claimed is:

1. A system for conditioning a plurality of flue gas streams in a plurality of flue gas conduits from a plurality of boilers for removal of particulate matter by electrostatic precipitation, comprising:

means for providing a single flowing mixture of sulfur dioxide gas and air;

means for dividing the single flowing mixture of sulfur dioxide gas and air into a plurality of flows of sulfur dioxide gas and air in a plurality of distribution conduits, each distribution conduit extending from said dividing means to adjacent one of the plurality of flue gas conduits;

a plurality of catalytic converters for converting sulfur dioxide and air into sulfur trioxide conditioning agent, each one of said plurality of catalytic converters being connected with one of the distribution conduits at its input end and with means to inject sulfur trioxide into one of the plurality flue gas conduits of one of plurality of boilers at its output end.

2. The system of claim 1 wherein a heater is provided for at least one of the plurality of flows of sulfur dioxide gas and air from one of the distribution conduits adjacent the input of one of the catalytic converters.

3. The system of claim 1 further comprising a plurality of flow control means, each one of the plurality of flow control means being connected to control the flow of sulfur dioxide and air in one of the distribution conduits, and a control having a plurality of control outputs, each of said plurality of control outputs being connected to one of said flow control means, said control being adapted for determining the need for conditioning agent for the flue gas flowing in each of the flue gas conduits in the system and for operation of said flow control means to control the flows of sulfur dioxide and air through said distribution conduits for conversion to sulfur trioxide.

4. The system of claim 1 wherein each of said plurality of catalytic converters has a size and capacity matched to the maximum flow of sulfur trioxide needed to condition flue gas from the boiler with which it is connected.

5. The system of claim 1 wherein at said control comprises means for determining a rate of discharge of a charged electrode of an electrostatic precipitator in the system and means for generating a conditioning agent demand signal based on said discharge rate of said charged electrode and for transmitting said conditioning agent demand signal to said control.

6. The system of claim 1 wherein said means for providing a single flowing mixture of sulfur dioxide gas comprises a sulfur burner, means for providing said sulfur burner with a flow of air, means for providing said sulfur burner with a flow of sulfur, and means for heating said sulfur burner.

7. The apparatus of claim 6 wherein the means for heating the sulfur burner comprises a gas-fired heater and a controllable valve connected with said controller to vary the flow of gas to said gas-fired heater.

8. The apparatus of claim 1 wherein said means for providing a single flowing mixture of sulfur dioxide and air, and a controller for controlling the single flowing mixture of sulfur dioxide and air and the plurality of flows of sulfur dioxide and air, are part of an integrated assembly for installation at a first convenient location, and said plurality of sulfur dioxide converter assemblies are adapted for installation at remote locations.

9. The system of claim 1 further comprising:
means for determining the sulfur content of the boiler fuel of each power-generating unit; and
means for providing data on the sulfur content of the boiler fuel to said controller,
said controller varying the rate of conditioning agent flow provided to each power-generating unit to compensate for changes in the sulfur content of the boiler fuel.

10. The system of claim 1 wherein said means for providing a controlled flow of sulfur dioxide gas includes a source of liquified sulfur dioxide and means for vaporizing said liquified sulfur dioxide to produce sulfur dioxide gas.

11. The system as in claim 6 wherein the $SO_2$ is provided by the sulfur burner at a concentration of approximately ten percent (10%).

12. The system as in claim 1 wherein the $SO_3$ and air mixture from at least one $SO_2/SO_3$ catalytic converters is delivered to the $SO_3$-injection means at a concentration of approximately two to six percent $SO_3$.

13. The system as in claim 6 wherein the sulfur burner heater maintains the temperature of the air delivered to the sulfur burner at a minimum of approximately 700° F. to effect spontaneous combustion of sulfur.

14. The system as in claim 1 wherein the control means monitors one or a combination of the following conditions to control the generation of at least one conditioning system: fly ash resistivity, precipitator power consumption, flue gas $SO_2$ levels and/or stack opacity.

15. Apparatus for conditioning boiler flue gas with sulfur trioxide for removal of entrained particles with an electrostatic precipitator, comprising:
an integrated assembly adapted for providing a flow of air and sulfur dioxide at a temperature in excess of the condensation temperature of sulfurous acid, said integrated assembly comprising first means for providing a flow of sulfur, second means for providing a flow of air, third means for providing a combined flow of sulfur dioxide and air at high temperature in excess of the condensation temperature of sulfurous acid and for dividing the flow of sulfur dioxide and air into a plurality of flows to provide their conversion to sulfur trioxide and injection into the boiler flue gas at a plurality of injection sites upstream of the electrostatic precipitator, and fourth means for supporting and carrying said first, second and third means as an integrated assembly; and
a plurality of sulfur dioxide conversion means, each of said sulfur dioxide conversion means being adapted for support and location remote from said integrated assembly adjacent an injection site for sulfur trioxide upstream of the electrostatic precipitator comprised a catalytic converter adapted for connection with one of the plurality of flows of sulfur dioxide and air and for conversion of the flow of sulfur dioxide and air into a flow of sulfur trioxide and air and means for controlling the operating temperature of said catalytic converter.

16. The apparatus of of claim 15 wherein each of said sulfur dioxide conversion means comprises a catalytic converter adapted for connection with one of the plurality of flows of sulfur dioxide and air and for conversion of the flow of sulfur dioxide and air into a flow of sulfur trioxide and air and means for controlling the operating temperature of said catalytic converter.

17. The apparatus of claim 15 for conditioning flue gas produced by a plurality of power-generating units with sulfur trioxide for removal of entrained particles by electrostatic precipitation from the flue gas carried by the plurality of conduits of the power generating units wherein each one of the plurality of sulfur dioxide converter assemblies is positioned adjacent a different one of the flue gas conduits of the generating units, and connected with said means for producing a flow of sulfur dioxide and air.

18. The system as in claim 15 further comprising at least one catalytic converter heater unit for maintaining the temperature of the sulfur dioxide and air flow delivered to the connected $SO_2SO_3$ conversion means at approximately 800° F.

19. A method of conditioning a flow of boiler flue gas with sulfur trioxide for treatment by electrostatic precipitator, comprising:

providing a flow of sulfur dioxide and air at a temperature above the condensation temperature of sulfurous acid;

dividing the flow of sulfur dioxide and air into a plurality of reduce volume flows of sulfur dioxide and air;

carrying the plurality of reduced volume flows of sulfur dioxide and air to a plurality of separate injection sites for conversion to sulfur trioxide and injection of sulfur trioxide into the flow of boiler flue gas while maintaining the plurality of reduced volume flows above the condensation temperature of sulfurous acid;

providing each reduced volume flow of sulfuric dioxide and air at a temperature in excess of the minimum temperature for its catalytic conversion to sulfur trioxide at one of the plurality of injection sites;

converting each reduced volume flow of sulfur dioxide and air into a flow of sulfur trioxide at one of the plurality of injection sites to thereby provide a reduced volume flow of sulfur trioxide sufficient for injection at each injection site; and immediately injecting each of the reduced volume flows of sulfur trioxide into the flow of boiler flue gas at each of the plurality of separated injection sites.

20. The method of claim 19 further comprising the steps of:

providing a sulfur burner to provide said flow of sulfur dioxide and air;

delivering a flow of sulfur to the sulfur burner;

providing a controlled flow of air into the sulfur burner;

combusting the sulfur in the sulfur burner to provide said flow of sulfur dioxide and air as an output; and providing each reduced volume flow of sulfur dioxide and air at an injection site adjacent one of a plurality of flue gas conduits of a plurality of boilers.

* * * * *

UNITED STATES PATENT AND TRADEMARK OFFICE
CERTIFICATE OF CORRECTION

PATENT NO. : 5,196,038
DATED : March 23, 1993
INVENTOR(S) : Robert A. Wright

It is certified that error appears in the above-identified patent and that said Letters Patent is hereby corrected as shown below:

In column 4, line 58, delete "SO:" and substitute therefor --$SO_2$--.

In column 7, line 55, after "317" insert --for--.

In column 9, line 36, delete "FIGS." and substitute therefor --FIG.--.

In column 13, line 50, delete "As" and substitute therefor --At--.

In column 14, line 7, delete "services" and substitute therefor --service--.

In column 15, line 2, delete "and".

In column 16, lines 44-45, delete "advantage" and substitute therefor --advantages--.

In column 18, line 44, delete "of", first occurrence.

In column 18, line 64, after "$SO_2$" insert --/--.

In column 19, line 5, delete "reduce" and substitute therefor --reduced--.

UNITED STATES PATENT AND TRADEMARK OFFICE
CERTIFICATE OF CORRECTION

PATENT NO. : 5,196,038
DATED : March 23, 1993
INVENTOR(S) : Robert A. Wright

It is certified that error appears in the above-indentified patent and that said Letters Patent is hereby corrected as shown below:

In column 19, line 14, delete "sulfuric" and substitute therefor --sulfur--.

Signed and Sealed this

Seventeenth Day of May, 1994

Attest:

BRUCE LEHMAN

*Attesting Officer*    *Commissioner of Patents and Trademarks*